Oct. 16, 1945.  M. L. FORREST  2,387,064
CHAIN SAW
Filed June 16, 1942  2 Sheets-Sheet 1
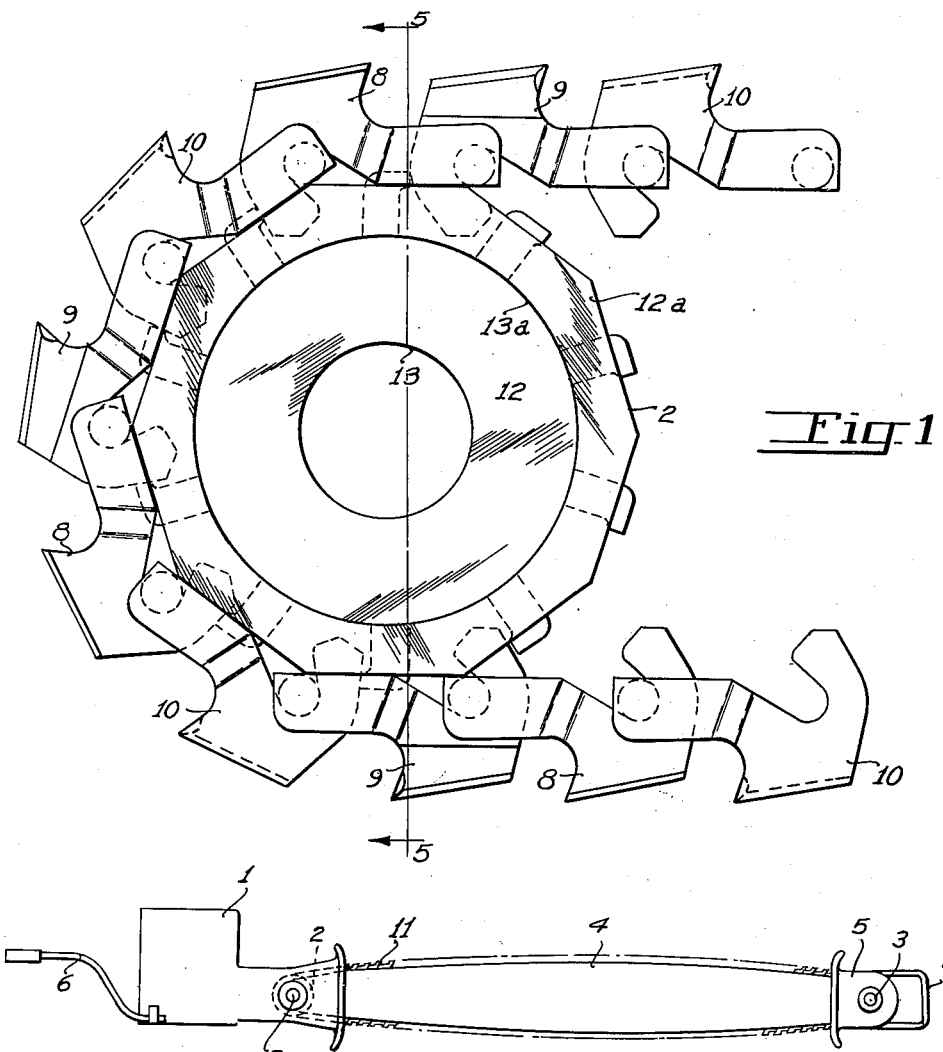
INVENTOR
Mark L. Forrest
BY
ATTORNEY

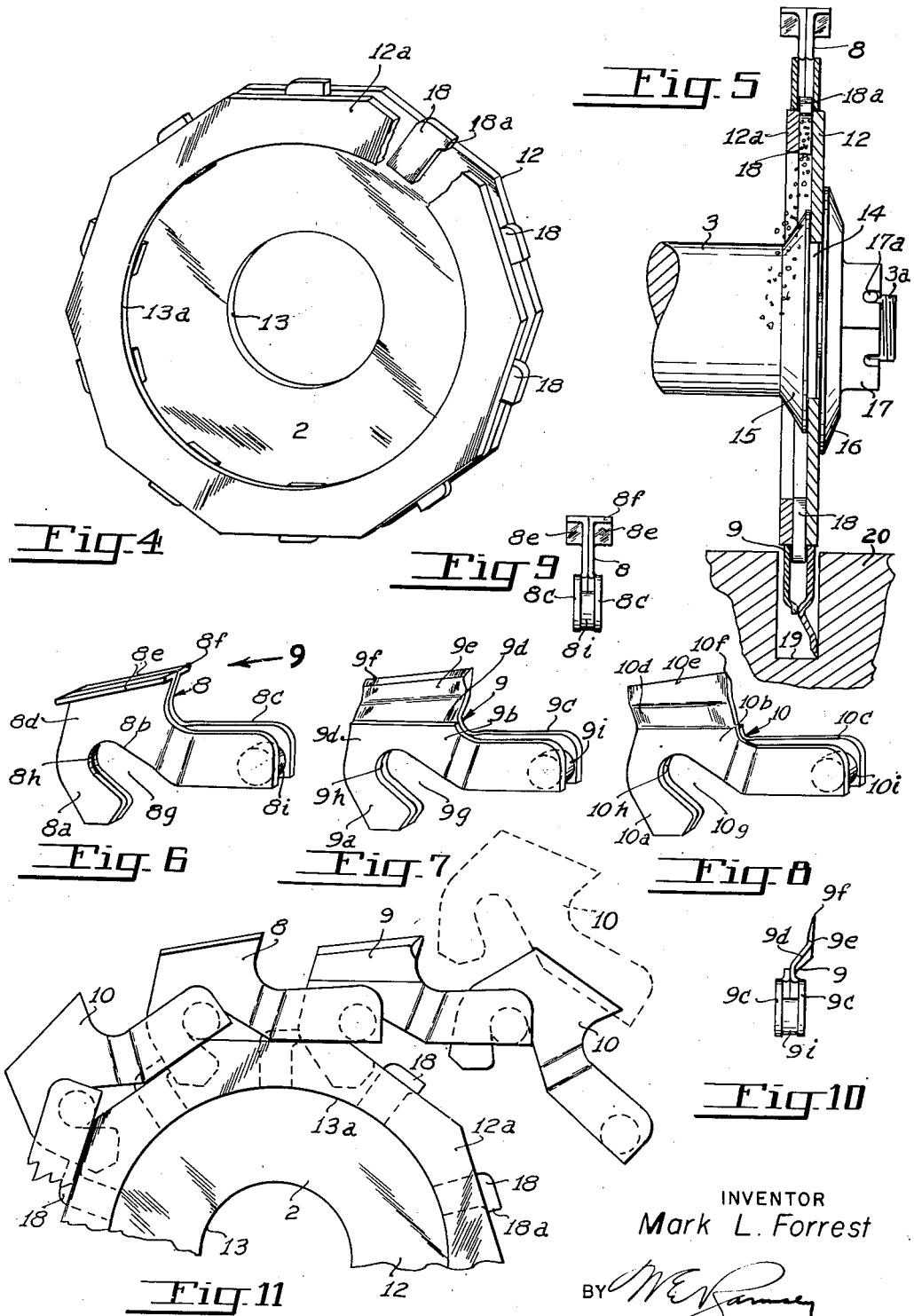

Patented Oct. 16, 1945

2,387,064

UNITED STATES PATENT OFFICE 2,387,064

CHAIN SAW

Mark L. Forrest, Portland, Oreg.

Application June 16, 1942, Serial No. 447,207

13 Claims. (Cl. 143—135)

My invention relates to sawing or cutting machines which have a plurality of cutting elements arranged in the form of an endless chain, and it relates more particularly to so-called chain saws used for falling and bucking timber. In said devices, it is desirable that the chain be simply and strongly constructed, be capable of having the parts thereof made for quick and easy detachment, and it is essential that the cutting elements operate smoothly and with minimum wear. When the sawing machines are portable, it is essential that the parts be made as light and as strong as possible to promote portability and said devices are used where repairs and replacement can be made only with difficulty, it is essential that repairs and replacement involve minimum mechanical difficulty.

A further object of my invention is to improve the sawing chain of such devices so that each of the members involve a simple structure and each sawing member be manually detachable.

A further object of my invention is to provide a sawing chain of this character in which the chain is made up of sawing members only, which are detachably secured one directly with the other and the parts are of uniform size and shape and thus, save for the type of cutting edge provided thereon, are inter-changeable.

A further object of my invention is to provide an endless chain of this character made up of sawing elements each element of which is engaged by the lug or tooth of a drive sprocket and thus each of them is positively driven to produce a uniform cutting action. To this end, I make each of said sawing or cutting elements so that it resembles a boot in outline. The heel portion thereof defines a hooked lug which extends below the remainder of said sawing member to provide driving engagement with a sprocket. The instep forms a seat for engaging a pivotal connection on an adjacent length and the toe portion carries a pivotal connection for engagement the seat formed of the instep of an adjacent length. The uppers portion carries a cutting element and the parts are so proportioned and arranged that detachment, although easily made, can be accomplished only when adjacent elements are arranged at predetermined angular positions. This permits easy disengagement but prevents inadvertent disengagement when the chain is slackened or is otherwise arranged out of tight operating relationship.

A further object of my invention is to provide a sawing device in which each of the sawing members constituting an endless chain bears upon the sprocket and the guide with a flat surface extending more than one-third of the total length of each of said sawing elements, and thus, a smooth running positive contact is provided to decrease wear or abrasion and the parts are prevented from tipping or canting, so that the entire chain operates smoothly and does not tend to run out of its normal operating plane.

A further object of my invention is to provide cutting and raker teeth of such shape that they may be sharpened many times and the cutting teeth and the raker teeth all given such rearward clearance as will diminish their over-all height more or less uniformly even though the cutting teeth are subject to greater wear and greater sharpening operations to cause them to function properly. This is accomplished by forming the raker teeth with greater rearward clearance than the cutting teeth. The relative difference in angularity is computed to correspond with normal diminishment in height, due to recurrent sharpening.

A further object of my invention is to provide a sawing chain made up of elements, each element of which is capable of being formed of an imperforate stamping, each element comprises but three members, two side members and a pivot member and such side members and pivot members are welded together to provide integral structures.

A further object of my invention is to provide a sprocket for a sawing device of the character described, which sprocket is designed to promote the easy flow of sawdust therethru without jamming or packing. Jamming or packing tends to cause the points of engagement of the chain with the sprocket to vary to such an extent that the pitch centers thereof do not coincide. Normally, the accumulation of sawdust and other foreign matter increases the pitch diameters and tends to increase the tension of the endless saw to such a point that it does not operate efficiently, if at all, and thus said parts require disassembly to remove the accumulation of such foreign matter.

A further object of my invention is to provide a sawing device of this character with a slip-joint or safety connection which will yield in the presence of abnormal stresses so that breakage of the saw chain or other driving parts is avoided.

Further and more detailed features of my invention are hereinafter described with reference to the accompanying drawings, in which:

Fig. 1 is a fragmentary elevation of a portion of a saw chain embodying my invention shown in operative engagement with a driving sprocket;

Fig. 2 is a fragmentary elevation of a portable chain saw embodying my invention, portions being shown in outline;

Fig. 3 is a fragmentary plan view of several links of a chain saw embodying my invention;

Fig. 4 is a perspective view of a sprocket having portions shown as broken away to disclose details of construction;

Fig. 5 is a more or less diagrammatic view taken as on the line 5—5 in Fig. 1, illustrating in addition the manner in which sawdust is permitted to flow readily therethru;

Figs. 6, 7 and 8 are perspective views of three different types of links of a saw chain embodying my invention;

Fig. 9 is a fragmentary elevation taken in the direction of the arrow 9 in Fig. 6 showing the details of a raker tooth;

Fig. 10 is a fragmentary elevation of a cutting tooth placed in the direction of the arrow 10 in Fig. 7; and Fig. 11 is a more or less diagrammatic view of a portion of a saw chain and sprocket which illustrates the manner in which the saw chain is manually detached.

My invention is particularly adapted for that type of chain sawing machine used in lumbering operations for falling and bucking trees. Such type of machine is illustrated in Fig. 2 and comprises a motor 1 usually an internal combustion engine but frequently an electric motor or an air motor or some other type of power. Power transmission mechanism drives to a pinion 2 carried by a drive shaft or arbor 3. Securely bolted to and forming an integral structure with the housing for the drive mechanism, is an elongated blade 4. An end housing 5 is carried by the end of said blade spaced most distantly from the motor. A pair of handles 6 is commonly provided adjacent the motor for carrying the chain saw and directing its cutting action. Ordinarily a looped handle or grip 7 is carried by the end housing 5 so that the two men may carry the saw between them and direct its cutting action. The foregoing is a description of a general type of machine to which my invention is particularly adapted and these features involve no substantial change in the general organization of such a saw.

My invention is directed to the improvement of the chain saw structure, the sprockets about which the saw chains are operatively arranged and the means by which one of said sprockets is driven and mounted to permit the ready discharge of sawdust from the chain and sprocket.

The saw chain embodying my invention comprises a plurality of links each of which carries a cutting element. Some of such cutting elements are designed to define the sides of the saw kerf and others are designed to rake up the sawdust from said kerf. I preferably arrange said links in a series of three elements; namely, a left-hand side cutter, a right-hand side cutter and a raker. Each of said links is similar to all of the remainder thereof except for the difference in the cutting elements formed thereon. This is illustrated in Figs. 6, 7 and 8 of the drawings.

A raker link is illustrated in Fig. 6 and comprises a body 8 resembling a boot in outline, having a heel portion 8a, an instep portion 8b, a toe portion 8c and an uppers portion 8d. The uppers portion terminates in two laterally turned flanges 8e, the forward edges 8f of which are sharpened to cut away and rake out chips, which have been partially or wholly cut away by the side cutters, hereinafter described. The space between the heel and the instep portion has an obliquely formed groove 8g extending toward the uppers portion and rearwardly towards the heel of said body. The uppers part terminates in a curved seat 8h which is adapted to engage a pivot on an adjacent link. A pivot 8i is secured at the toe of the body and comprises a relatively short length of cylindrical stock. The body is made of two pieces, preferably welded together, and the toe portion diverges outward to provide a bifurcated section, between the bifurcations of which the pivot 8i is welded. The raker link thus comprises but three members, two side members and a pivot member and said parts are welded together. It is to be noted that neither of the two side members is perforated, and thus, said members are not weakened. Thus, relatively thinner sections of material can be used for links thus constructed than if said members were perforated to accommodate a bolt, screw, rivet, bushing, or other type of fastening device.

The link illustrated in Fig. 7 is a left-hand side cutter and similar references are given to the comparable parts except that they are preceded by the numeral 9. Thus, the heel portion is 9a and the end portion is 9b, and so on. It is to be noted, however, that only one of the body halves extends upwardly to form a laterally flanged cutting edge, 9e. Such cutting flange is laterally extended to cut one side of a kerf which is slightly wider than the remainder of the chain, as is illustrated in Fig. 5. In operation, I preferably provide for approximately .040 inch clearance at each side of the blade. This, however, is a matter of choice and is fixed by the particular saw filer and cutter. It is necessary to have sufficient clearance at the side of the saw to prevent rubbing or binding of the parts.

Link 10 is constructed similarly to the link 9, except that it is opposite hand. The lateral flanged portion 10e is formed on the body half on the opposite side to the one on which lateral flange portion 9e is formed. Otherwise, the same parts are given similar reference numerals.

An entire saw chain is made up of a plurality of series of links 8, 9 and 10 with the heels to each inserted between the bifurcated toe portions of the adjacent one and with the instep overlying the pivot element of one link engaging with the pivot bearing of the other. The seat of one link has a smooth running fit upon the pivot of the adjacent link and thus, there is no substantial end play or stretch in the chain. The links may be disengaged only when they are arranged at an angle one of the other, as illustrated in Fig. 11. Thus, when the inner face of the heel of one link lies substantially perpendicular or normal to the sole of the toe of the other link, it may be lifted upwardly and disengaged in the manner illustrated and as outlined. In all other positions, the outward slope of the instep of the link prevents unhooking because of the upward and backward inclination of the groove in said link. Thus, to separate the saw chain at a point, it is slackened off by devices normally provided in a chain saw machine until sufficient slack is provided so that one link can be depressed and partially rotated in the manner shown in Fig. 11. This permits said link to be detached. The entire chain can then be renewed without removing either the driving sprocket or pinion 2 or the idler pinion or sprocket at the other end thereof, about which said chain turns. Individual links can be taken from the chain and others substituted therefor in the same manner and then when the chain is to be reassembled, it can be arranged in endless form about the sprockets on said chain sawing machine and the two end links engaged in the reverse manner illustrated in Fig. 11. Because of the fact that the bodies of all of said links are identical, they may be interchanged one with the other. I deem it preferable, however, that said links be arranged in such order that the series of two opposite hand cutters and the raker follow in sequence throughout the chain. It is to be noted that the chain is thus wholly manually detachable and the chain is made up of said links, has no pins, rivets, bushings, screws, guide links, connecting links or other auxiliary devices which are commonly found in saw chains as they are presently constructed.

The drive pinions or sprockets are preferably constructed as illustrated in Figs. 1, 4, 5 and 11. That is, a sprocket comprises two discs 12 and 12a; said discs preferably are made of plate steel and their peripheral surfaces are identical. Their bores, however, differ in diameter, as is shown in said drawings. The annular disc 12 has a bore 13 only sufficient to accommodate shoulder 14 of the drive shaft or arbor 3. Said shaft has a collar or shoulder 15 of greater diameter formed adjacent to shoulder 14 to engage one face of said disc 12 and the other face is engaged by a washer 16. The washer and collar or shoulder 15 frictionally engaged the faces of said disc 12 and a tight frictional engagement is maintained by setting up the castellated nut 17 to provide sufficiently secure engagement. Then a pin or cotter key is inserted through a hole in the threaded end 3a of the shaft or arbor 3 to prevent said castellated nut from backing off. Although I have shown no resiliency in the washer 16 or collar or shoulder 15, it is desirable in some instances to provide elasticity so that the desired frictional engagement may be maintained even although the parts become worn slightly. This may be accomplished by providing a spring washer, gasket, or other device which will readily suggest itself to a mechanic skilled in the art. The shoulder or the collar or both may be provided with some degree of elasticity to produce this result.

Lying between said annular discs 12 and 12a are spaced lugs 18. It is to be noted that the peripheral surfaces of the discs are not circular but are polygonal. Said lugs are arranged substantially at the middle of each of said angular faces and are more or less L shaped in outline although this is not essential. The lateral projection 18a of each of said lugs is provided to engage the rearward face of the heel of each of the links, as shown in Figs. 1 and 11, and the remainder is relieved below said lateral projection so that a base of some area is provided, but one limited by the proportions of said lateral projection. This provides a broad and secure point of engagement between the lugs and the links but not so large that foreign material might lodge thereon and destroy the nice arrangement of the lugs on the sprocket, and the links operatively joined thereto. Attention is particularly called to the fact that the bore of disc 12a is substantially larger than the bore 13 of disc 12 and thus there is an annular passageway provided from the spaces between lugs and the surface of the drive shaft or arbor 3. Thus, sawdust may pass down between said lugs and out of said bore 13a in the manner illustrated in Fig. 5. Sawdust or other foreign matter will then not clog up said pinion or sprocket 2. I deem it preferable that said pinion or sprocket be made of two discs of plate and a plurality of lugs arranged substantially as is shown. I do not wish myself limited to this structure, however, because such sprockets could be cast or otherwise formed as an integral structure and thus when I speak of lugs, and discs, I am only referring to the physical parts of said sprocket or pinion. After all, when said parts are welded together they form an integral structure independently of the manner in which they are originally coupled.

A chain sawing machine embodying my several improvements operates in the usual fashion to cut a kerf 19 in a member 20. The kerf is preferably formed about .080 inch wider than the main body portions of the saw chain to provide clearance, as has been previously described, although the amount of clearance is a matter of choice. Because of the fact that said saw chain does not require bolts, rivets, or other parts, and because the members thereof are imperforate and thus are unweakened, I have been able to construct a saw chain of only approximately one quarter inch overall width, whereas other chains made with conventional types of fastening devices have had to be made of a width approaching one-half inch and thus are chains approximately double mine which have to cut away approximately twice as much wood in forming a kerf. This not only is wasteful of wood but more particularly is wasteful of power and provides a kerf of such width that it is difficult to form such a kerf merely by cutting the marginal edges and then raking out the intermediate portions. Said rakers frequently have had to perform the function of gouging out the major portion of the material in the kerf because of such width and thus have not produced smooth-cutting action. Because of the fact that a kerf may be cut of only approximately one-quarter inch with my saw, embodying the improvements aforesaid, said kerf may be efficiently cut and the sawdust severed and removed smoothly, uniformly and cleanly. Attention is called to the fact that each of the cutting members of the several side cutting links and the raker links are elongated, and their forward edges are adapted to constitute cutting edges as heretofore described. That is, the forward edges are cut to form gullets. Each of said teeth are also provided with rearward clearance so that as each of said teeth is resharpened and material removed therefrom, the total overall height of the various cutting teeth may be maintained more or less uniform. It is necessary to remove more material from the cutting teeth 9 and 10 than it is from the raker teeth 8. Thus, if the same degree of rearward clearance was provided for the cutting teeth as for the raker, then as said gullets are formed deeper and deeper and more material is removed, then the overall length of the cutting teeth would decrease faster than would that of the raker teeth. For this reason, I provide substantially more rearward clearance in the raker teeth than in the cutting teeth as can be noted by observing the teeth in Fig. 1 closely. I deem this matter of substantial importance so that the teeth making up the cutting elements and raker elements of the saw chain will be maintained in proper relationship. That is, the teeth will be maintained jointed automatically by reason of the fact that the raker teeth are given this greater rearward clearance.

It might be said that the links of the saw chain are engaged one with the other by a pivot-and-slot connection or by a hook-and-pivot connection; the hook being provided by the under cut heel and slot and the pivot being formed by the pivot element arranged in the toe of each of the links.

It is to be noted that the sole of the toe portion of each of the links defines a flat surface and occupies over one-third of the length of each of the links. Said flat sole of the toe is adapted to bear not only upon the flat polygonal surfaces of the sprockets, but also and more important, the said flat surfaces bear upon the edges of the blade 4 to prevent tipping or canting and to provide a sufficiently large surface that wear and abrasion is minimized. Because said flat portions of the sole of the toe of each of the links does bear securely upon the surfaces of the sprocket and of the blade, it is not essential that the engagement of the parts be made with close finished fit as long as the seat at the end of each slot has a good-running fit with the pivot of the adjacent link.

The spaces between the lugs 18 on the sprocket not only provide apertures between said lugs through which the sawdust is permitted to flow freely, but also said spaces provide pockets for accommodating the depending heel portions of each of the links in the manner shown in Figs. 1 and 11. It is to be noted that the heel portions in entering said pockets and emerging therefrom rock and tend to move or displace any sawdust, particularly pitchy sawdust, which might tend to adhere to the inner or opposed faces of the discs lying at opposite sides of lugs 18 of each of the sprockets. Also, the sole of the toe of each member lies substantially tangential to a continuation of the peripheral surface of each of these pivotal elements. This permits the links to move as closely as is feasible to the pitch diameter of the sprocket without causing the engagement of the lugs with the dependent heel portions of the links to tend to enlarge said pitch diameter.

It will be understood that in the specification and claims directional terms such as "vertical," "horizontal," "above," "below," "front," "rear" and the like are employed for convenience in description and without limitation as to the plane of operation of the saw, such terms having reference to a position of the chain members selected for the purposes of description, generally herein a position as at the top in Fig. 1 and as in Figs. 6, 7 and 8 showing chain members separately.

I claim:

1. A chain saw comprising a plurality of saw members pivotally joined one with another, manually detachable means joining said members to adjacent members, said saw members being similar one with the other, each comprising two formed side elements joined solidly together and resembling a boot in outline, defining heel, toe, instep and uppers portions, the toe portion of said saw member being bifurcated from a point adjacent the instep portion to the tip of said toe portion, and a pivot element spanning the space between the bifurcated toe portions and being arranged adjacent the tip of the toe, the bifurcated portion lying between said pivotal element and the instep portion defining a pocket for engaging a sprocket lug therein.

2. A chain saw comprising a plurality of saw members pivotally joined one with another, manually detachable means joining said members to adjacent members, said saw members being similar one with the other, each comprising two formed side elements joined solidly together and resembling a boot in outline, defining heel, toe, instep and uppers portions, the instep portion of said saw member defining a seat and a slotted guideway for engaging the pivotal element on an adjacent member, said guideway sloping obliquely rearwardly and upwardly towards said uppers portion.

3. A chain saw comprising a plurality of saw members pivotally joined one with another, manually detachable means joining said members to adjacent members, said saw members being similar one with the other, each comprising two formed side elements joined solidly together and resembling a boot in outline, defining heel, toe, instep and uppers portions, the toe portion of said saw member being bifurcated from a point adjacent the instep portion to the tip of said toe portion, a pivot element spanning the space between the bifurcated toe portions and being arranged adjacent the tip of the toe, the bifurcated portion lying between said pivotal element and the instep portion defining a pocket for engaging a sprocket lug therein, and the sole of the toe portion lying substantially tangential to the pivotal element in said toe portion.

4. A chain saw comprising a plurality of saw members pivotally joined one with another, manually detachable means joining said members to adjacent members, said saw members being similar one with the other, each comprising two formed side elements joined solidly together and resembling a boot in outline, defining heel, toe, instep and uppers portions, the heel portion depending below the remainder and constituting a driving lug, the toe portion of said saw member being bifurcated from a point adjacent the instep portion to the tip of said toe portion, a pivot element spanning the space between the bifurcated toe portions and being arranged adjacent the tip of the toe, the bifurcated portion lying between said pivotal element and the instep portion defining a pocket for engaging a sprocket lug therein, the instep portion of said saw member defining a seat and a slotted guideway for engaging the pivotal element on an adjacent member, and the uppers portion being bent laterally and defining a cutting element.

5. A chain saw comprising a plurality of saw links identical save as to cutting elements and being pivotally joined end to end subject to ready manual detachment, each link comprising a pair of similar metal plate members juxtaposed flatwise in matching relation with their fore portions oppositely offset to present a vertically open pocket between them, said members of each link being integrally bonded together as a substantially homogeneous metallic unit and having a transverse pivot extending between and imperforately united with the offset fore portions, each link having an inclined open slot extending upwardly and rearwardly from adjacent the lower rear of its pocket and having a vertically projective cutting element, the slot of each link providing an open bearing seat for the pivot of the link next following, and the leading region of each link pocket adjacent its pivot adapted to receive the lower rear portion of the link next in advance, in manually releasable hooked engagement with said pivot.

6. A chain saw according to claim 5 wherein the link slots and pivots are so constructed and arranged that unhooking release of adjacent links requires relative swinging thereof only through an angle of substantially less than 90° from a position in which the lines joining the pivot center and the pivot-bearing center of the respective links are in straight prolongation of each other.

7. A chain saw comprising a plurality of saw links pivotally associated in end to end relation, said links all substantially identical save as to cutting elements, each link formed by a pair of like metal plate members solidly joined together flatwise as an integral imperforate metallic unit having a front horizontal connective part with laterally spaced walls supporting a transverse pivot at their fore ends and a rear part of a thickness corresponding to the wall spacing of the front part, said rear part disposed in longitudinal line with the front wall spacing and projecting vertically above and below said walls, an oblique slot formation opening upwardly and rearwardly into the rear part and defining an open pivot bearing at its upper end, and a cutting element at the upper portion of said rear part.

8. A link for a chain saw consisting of an elongated body formed of an integral imperforate metallic mass of substantially uniform consistency throughout, said body having at its fore portion laterally spaced walls defining an open pocket, transverse pivot means at the front end of said walls, a rearwardly inclined slot formation behind said spaced walls open at one end for entrance and pivotal seating of the like pivot means of a similar link, the lower rear part of the body defining the rear margin of the slot formation and including a lug pendent below the spaced walls, and the upper rear part of the body presenting cutting means above and behind the said spaced walls.

9. In a chain saw, a set of generally similar saw links detachably pivotally interengaged end to end, each such link comprising an integral elongated metallic body including front and rear portions, one portion formed with a vertically open horizontally extensive pocket having a transverse pivot element across the open end thereof, the other portion being solid and laterally reduced and having an open slotted bearing formation insertible into the pocket of the next link for pivotally connective bearing engagement with the pivot element thereof, each such link having rearward facing means on one portion adjacently below the longitudinal line of pivot centers for driving engagement by a sprocket, and each link having on the laterally reduced solid portion a longitudinally extensive upward projection of rearwardly decreasing height adapted to present for each link a forwardly facing sawing element including for some links right and left cutters and for others right and left rakers.

10. A sawing link member for manually detachable insertion at any location along a chain saw formed by a multiplicity of such members all substantially identical save as to sawing elements and pivotally joined end to end, said link member comprising an integral elongated metallic body having leading and trailing portions of about equal length, one portion formed by relatively thin flat laterally spaced upright walls merged together at midlength of the body, the other portion formed by a solid flat upright wall in longitudinal line with the inter-wall spacing of the first-mentioned portion, one of said portions having at its outer end a lateral pivot and the other portion being formed with an open-end bearing slot inclined away from the pivot and adapted to receive the pivot of an adjacent like member, rearward facing means on one portion adjacently below a longitudinal line joining the pivot axis and the pivot center position of the bearing slot, for driving engagement by a sprocket, and a longitudinal extensive upward projection on one portion, of rearwardly decreasing height, providing a shank for a sawing element.

11. A link for a chain saw, said link comprising an elongated metallic body adapted for detachable pivotal end-to-end connection with other links, and a longitudinally extensive upward projection upwardly terminating in a lateral flange, said upward projection being of rearwardly decreasing height, said projection defining a tooth shank in a longitudinal plane spaced inwardly from outer side face portions of the body and having continuously along its upper rearwardly inclining portion a deflected front-sharpened sawing element provided by said lateral flange.

12. A link for a chain saw, said link comprising an elongated metallic body adapted for detachable pivotal end-to-end connection with other links, and a longitudinally extensive upward projection of rearwardly decreasing height, said projection defining a tooth shank in a longitudinal plane spaced inwardly from outer side face portions of the body and having continuously along its upper rearwardly inclining portion a lateral flange extending from said plane of the shank and outward toward the plane of a side face of the body, the forward edge of said flange being bevel-sharpened for sawing purposes.

13. In a chain saw, a set of generally similar saw links detachably pivotally interengaged end to end, each such link comprising an integral elongated metallic body having at respective ends a transverse pivot and an open pivot bearing, an upward extension on each link body of at least approximately one-half the length thereof providing a tooth shank of rearwardly decreasing height and defining a gullet in advance of the shank, said shanks of some links having a beveled kerf-side cutting formation at the upper portion of their gullet-facing wall and continuously rearward along their top edge portion constituting them as kerf-side cutter teeth, the shanks of other links each upwardly terminating in a lateral flange continuously along its upper margin and presenting a gullet-facing beveled formation constituting them as kerf raker teeth, the rate of rearward decrease in height of the cutter-teeth shanks being predeterminedly less than that of the raker-teeth shanks thereby to provide a greater rearward clearance for the raker teeth proportioned to maintain substantially the same relative over-all height for the cutter and the raker teeth under the normal greater resharpening requirements for the cutter teeth.

MARK L. FORREST.